Feb. 25, 1930.  H. C. LORD  1,748,486
JOINT
Filed May 31, 1927
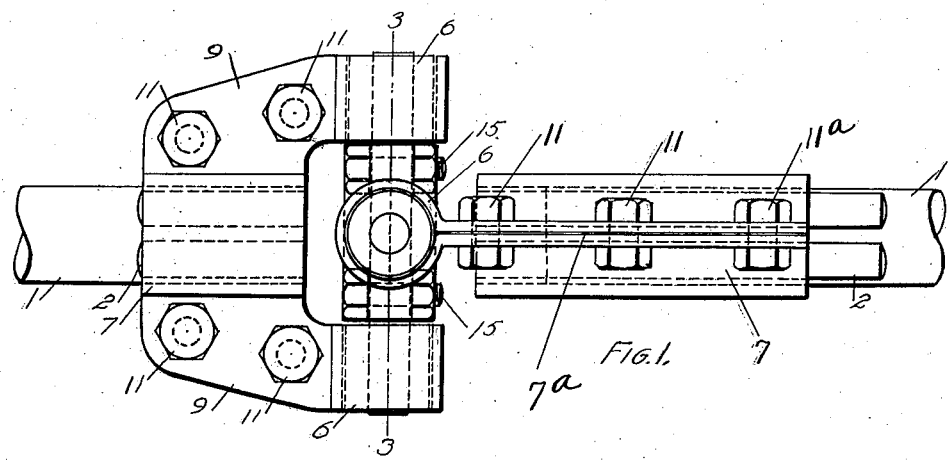
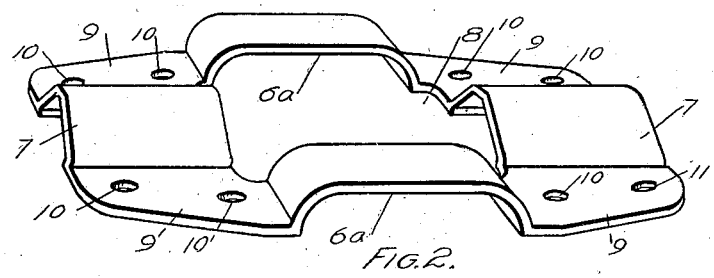
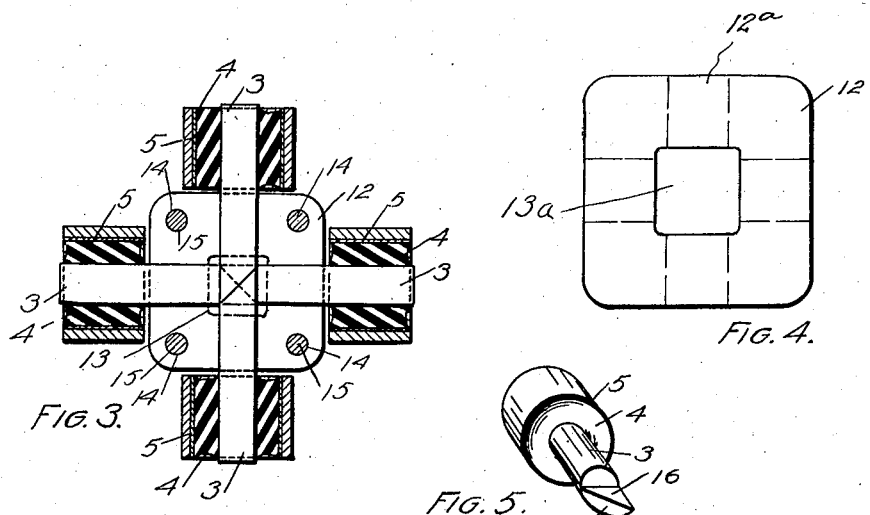
INVENTOR.

Patented Feb. 25, 1930

1,748,486

UNITED STATES PATENT OFFICE

HUGH C. LORD, OF ERIE, PENNSYLVANIA

JOINT

Application filed May 31, 1927. Serial No. 195,299.

The invention is particularly advantageous for universal joints and is so shown. Universal joints in many situations, such as automobiles, are driven at very high speeds and weight is, therefore, quite a factor with relation to such joints. By utilizing rubber as the joint member a desirable form of connection is provided from sheet metal. This not only makes a very light structure but one that may be manufactured within close limits at a very low price. The invention also involves an improvement in the mounting of the pins on which the rubber is placed. Features and details of the invention will appear more fully from the specification and claims.

A preferred embodiment of the invention is illustrated in the accompanying drawings as follows:—

Fig. 1 shows a side elevation of the joint as a universal.

Fig. 2 a perspective view of a stamping forming one of the connecting members of the joint.

Fig. 3 a section on the line 3—3 in Fig. 1.

Fig. 4 a plan view of a blank from which the clamp forming the cross of the universal is formed, Fig. 5 a perspective view of one of the joint members.

1 marks the shafts leading to the universal. These shafts have the squared ends 2. The rubber joints are provided with a central pin 3, a rubber bushing 4 and an outer shell 5, the rubber being preferably united with the pin and shell by surface bonding.

The forks for the universals are formed by stamping as shown in Fig. 2 and the ends of the forks are provided with eyes 6, these eyes being formed in a loop 6ª of the stamping, the stamping being bent around upon itself at this loop forming the eye. Sleeves 7 are formed at the attaching ends of the forks, a half sleeve being formed at each end of the stamping, the halves being brought together as the eyes 6 are formed. An opening 8 which forms the forks is preferably formed in the flat blank somewhat larger than the ultimate opening and the loops 6ª and the sleeve portions 7 are stamped separately, thus preventing the side-drawing and weakening of the metal.

Plates 9 between the eyes 6 and sleeves 7 are perforated at 10 and bolts 11 extend through these perforations, the bolts 11 next the eyes closing the eyes so as to clamp them upon the shells 5 and the bolts further clamping the sleeve 7 on the squared end of the shaft 1 if desired, as shown at the left of Fig. 1. If desired the sleeve may be lengthened as shown at the right of Fig. 1 and additional bolts 11ª provided for this elongation. Here a shim 7ª may be used and the sleeve operating in connection with the squared end form a slip joint.

The pins 3 extend between clamping plates 12, these clamping plates having recesses 12ª to receive the pins. The clamping plate in blank form has the opening 13ª and the recesses 12ª are stamped separately, thus drawing the metal together and reducing the opening 13ª to the opening 13 as shown in Fig. 3. Thus the corners at the recesses may be made much sharper and the drawing of the metal obviated. The plates have perforations 14 and clamping bolts 15 extend through the corners of the plates drawing the plates together into clamping relation on the pins 3. In order to lock the rubber joints in neutral position with the joint in alinement the pins are provided with semi-cylindrical ends 16. The plane surfaces of one pair of joints overlap and extend over the plane surfaces of the other pair of joints at the center and the joints are bevelled at 17 so that the joints of the same pair overlap. Thus the pins are braced one with the other at the center and this materially assists the clamping action in holding them against the strains sustained by the joint.

What I claim as new is:—

1. In a universal joint, the combination of two rubber joint members, each member having a central pin extending inwardly and engaging and overlapping the pin of the opposite member and a central block engaging the inwardly extending portions of the central pin.

2. In a universal joint, the combination of four rubber joint members arranged in pairs, one pair being at right angles to the other, each member having a central pin engaging the other member of the pair and overlapping the ends of the pins of the companion pair and a central block engaging the overlapping portions of the pins.

3. In a universal joint, the combination of four rubber joint members arranged in pairs, one pair being at right angles to the other, each member having a central pin, the pins of each pair engaging and overlapping each other and engaging and overlapping the ends of the pins of the companion pair and a central block engaging the overlapping portions of the pins.

4. In a universal joint, the combination of four rubber joint members, each pair having a central pin cut away at its inner end, the cut-away portion having a semi-cylindrical shape, the two ends of each pair overlapping the ends of the companion pair and a central block engaging the overlapping portions of the pins.

5. In a universal joint, the combination of four rubber joint members, each pair having a central pin cut away at its inner end, the cut-away portion having a semi-cylindrical shape, each semi-cylindrical end being beveled and overlapping the end of the pin of the other joint of the pair and a central block engaging the overlapping portions of the pins.

In testimony whereof I have hereunto set my hand.

HUGH C. LORD.